(No Model.)

A. H. KOHL.
HOOF SHEARS.

No. 582,932. Patented May 18, 1897.

Witnesses:
A. R. Appleman
A. M. McLean

Inventor.
Anthony H. Kohl.
By Henry C. Evert, Att'y.

UNITED STATES PATENT OFFICE.

ANTHONY H. KOHL, OF BLAIRSVILLE, PENNSYLVANIA.

HOOF-SHEARS.

SPECIFICATION forming part of Letters Patent No. 582,932, dated May 18, 1897.

Application filed August 1, 1896. Serial No. 601,335. (No model.)

*To all whom it may concern:*

Be it known that I, ANTHONY H. KOHL, a citizen of the United States of America, residing at Blairsville, in the county of Indiana and State of Pennsylvania, have invented certain new and useful Improvements in Hoof-Shears, of which the following is a specification, reference being had therein to the accompanying drawings.

This invention relates to certain new and useful improvements in hoof-shears, and has for its object to construct a device of the above-described class that will be extremely simple in its construction, strong, durable, effectual in its operation, and comparatively inexpensive to manufacture.

A further object of the invention is to construct hoof-shears that will be provided with a removable knife, so that the same may be readily detached for sharpening when so desired; furthermore, that will be adjustable and that will be easily operated.

With the above and other objects in view the invention finally consists in the novel construction, combination, and arrangement of parts to be hereinafter more specifically described, and particularly pointed out in the claims.

In describing the invention in detail reference is had to the accompanying drawings, forming a part of this specification, and wherein like letters of reference indicate similar parts throughout the several views, in which—

Figure 1:
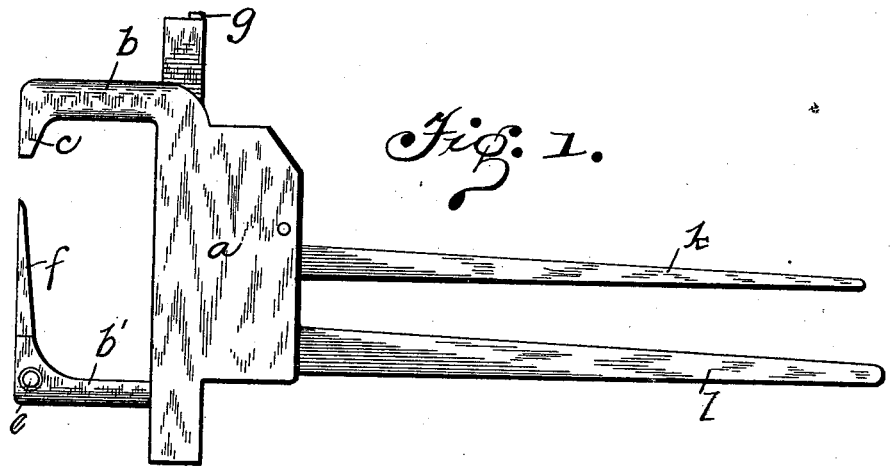
Figure 2:
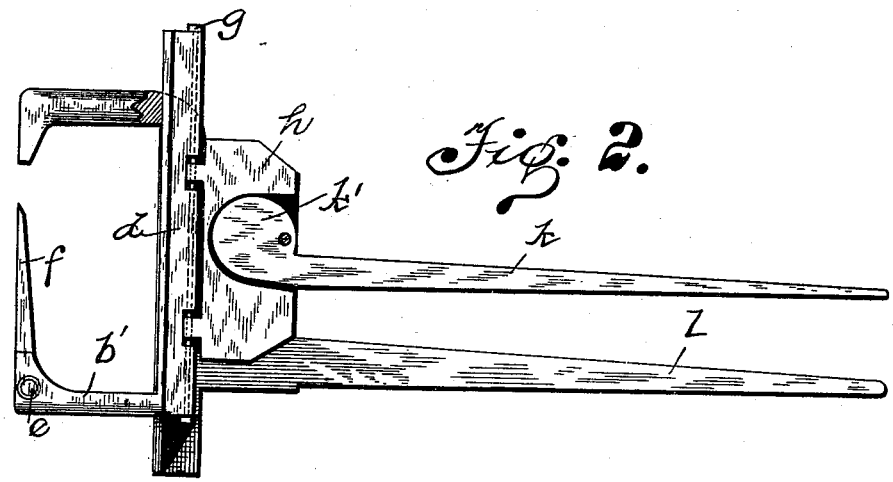
Figure 3:
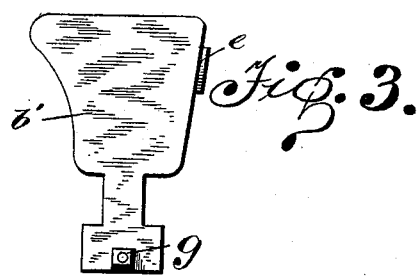

Figure 1 is a side view of my improved hoof-shears. Fig. 2 is a similar view, partly in section, to show the operation of the shears. Fig. 3 is a bottom view of the arm $b'$.

In the drawings, $a$ represents the yoke, formed at one end with an arm $b$, having a downwardly-projecting point $c$, which forms the knife-seat. A bar $d$ is adapted to operate in the yoke $a$, said bar carrying an arm $b'$, similar to the arm $b$, and to which is attached, by means of a screw-bolt $e$, the knife $f$. This knife is preferably secured by lugs on the arm $b'$, one of which is detachable in order to readily remove the knife. To the bar $d$ is secured, by means of a bolt $g$, running the entire length of same, a block $h$, provided with a cut-away portion, in which is pivotally secured the movable half $k$ of the handle. This movable portion of the handle is formed at the inner or pivotal end with a disk or cam $k'$ to operate on the rim formed by the cut-away portion of the block, and thus bring the jaws together. The other half $l$ of the handle is attached to the yoke proper.

The operation of my improved hoof-shears will be readily apparent from the views of the same that I have shown in the drawings, as it will be observed that when the operator grasps the handles and raises the portion $k$ it will cause the cam $k'$ to engage the block, thus forcing the arm $b'$, carrying the knife, away from the arm $b$ and knife-seat $c$, and when this portion of the handle is again forced toward the portion $l$ the cam will retract the movement of the block and knife, bringing the latter toward the arm $b$ and in contact with the seat $c$, clipping off the portion of the hoof that has been engaged between said knife and seat.

It will be observed that I have provided for the adjustment of the block by my manner of securing the same to the bar, the operation of adjusting being easily performed by turning the bolt $g$, as will be readily apparent. It will also be noted that the manner of securing the knife will permit of the quick and easy removal of the same in order to sharpen it, permitting a much more effectual edge being placed on the blade than could be done by sharpening the same while in the tool, and the jaws formed at each side of the blade-seat will serve to hold same rigidly and firmly in position.

It will also be observed that various changes may be made in the details of construction of my improved hoof-shears without departing from the general spirit of my invention.

Having fully described my invention, what I claim as new, and desire to secure by Letters Patent, is—

1. In an implement of the class described, a yoke having a bar operating therein, said bar provided with an outwardly-extending arm carrying a knife, a block secured to the bar by means of a bolt passing through the bar, a cam-lever pivotally secured in a cut-away portion in the block to engage the same and force the knife in engagement with an arm carried by the yoke, substantially as shown and described.

2. In a device of the character described, a yoke, an arm formed at one end of said yoke, a downwardly-projecting point formed on said arm, a handle formed with said yoke, a second handle pivoted in said yoke, a cam-disk formed on the inner end of the last-named yoke, a bar slidable in the yoke, an arm formed with said bar and adapted to slide vertically in a slot of the yoke, a knife removably secured to said arm, a block attached to said rod, said rod having a cut-away portion in which the cam-disk is adapted to fit, substantially as described.

In testimony whereof I affix my signature in presence of two witnesses.

ANTHONY H. KOHL.

Witnesses:
D. M. KIER,
J. M. HARVEY.